United States Patent Office 3,778,379
Patented Dec. 11, 1973

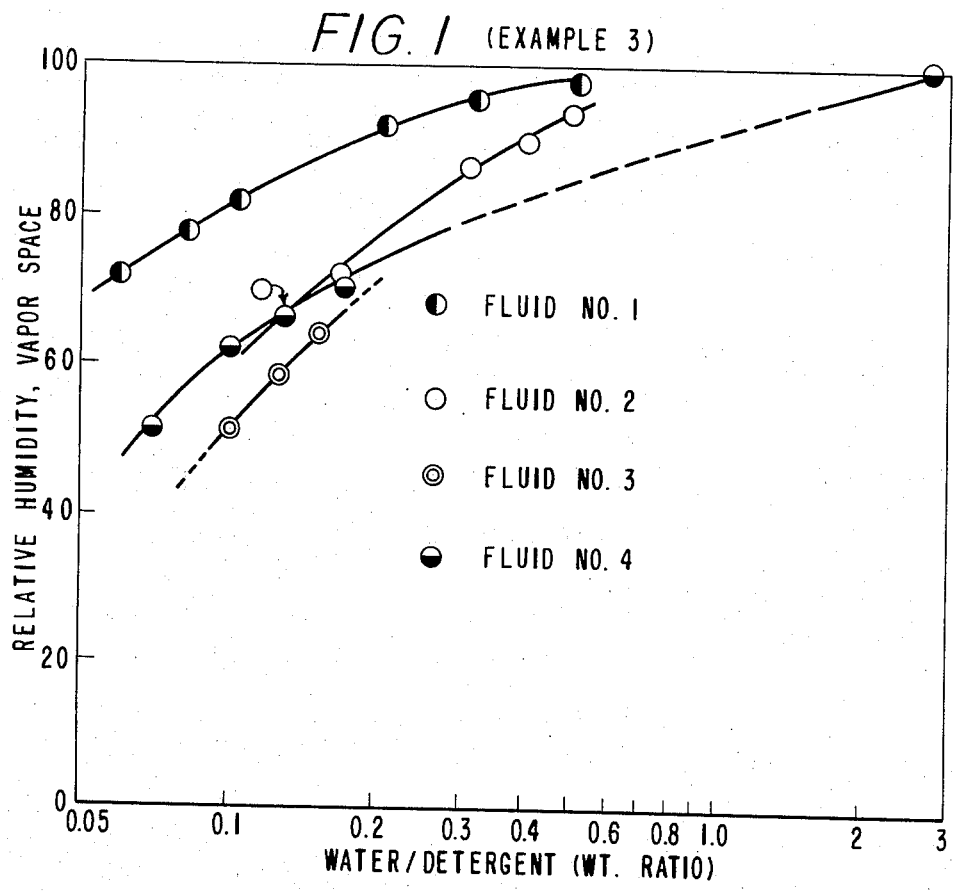
FIG. 1 (EXAMPLE 3)
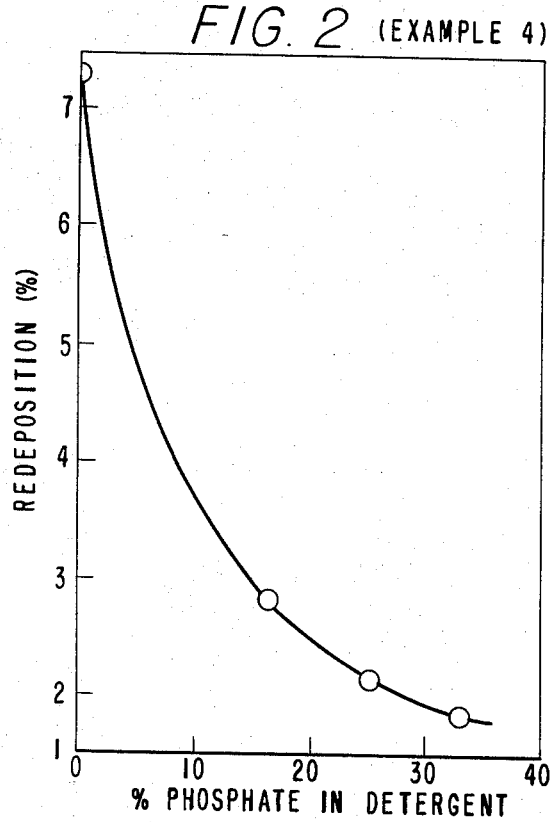
FIG. 2 (EXAMPLE 4)

3,778,379
FLUOROCARBON DRY CLEANING COMPOSITIONS
Plutarch Constantine Papannou, Carneys Point, N.J., assignor to E. I. du Pont de Nemours and Company, Wilmington, Del.
Filed Jan. 21, 1972, Ser. No. 219,791
Int. Cl. C11d 7/52
U.S. Cl. 252—171                   11 Claims

ABSTRACT OF THE DISCLOSURE

Dry cleaning compositions containing 1,1,2-trichloro-1,2,2-trifluoroethane or trichlorofluoromethane, an alkylbenzenesulfonate, for example, isopropylammonium dodecylbenzenesulfonate, an alkyl phosphate, for example, diethanolammonium mixed mono- and di($C_{8-12}$)alkyl phosphates, and water (optionally), said compositions being especially useful in commercial dry cleaning processes to minimize redeposition of particulate soil and to minimize water damage to the clothing if water is employed in the dry cleaning system.

BACKGROUND OF THE INVENTION (1) Field of the invention

The invention is in the field of dry cleaning.

(2) Description of the prior art

Dry cleaning, broadly defined, comprises the washing of materials using organic solvents. Most often drycleaned are textiles, particularly clothing. Other materials often dry-cleaned are furs, leather, feathers and the like. As used hereinafter, the term "clothes" is intended to comprise all materials conventionally dry-cleaned.

Organic solvents of the prior art generally are able to dissolve fatty or oily soils without damaging textile fibers and other materials. The use of such solvents, unlike the use of water, avoids wrinkling, shrinking and pilling. Drying, pressing and other finishing of clothing is, therefore, substantially easier after dry cleaning than it is after washing with water. The most common organic solvents of the prior art comprise petroleum distillates such as Stoddard solvent, carbon tetrachloride, trichloroethylene and tetrachloroethylene. Whereas the use of the above-named chlorine-containing solvents avoids the flammability inherent in petroleum distillates, such solvents may provide other problems during use because of their toxicity, corrosivity and, especially in the case of trichloroethylene, their over-aggressiveness toward sensitive dyes and clothing ornaments. Solvents which are especially useful because of their nonflammability and lower toxicity and agressiveness are the chlorofluorocarbons, principally trichlorofluoromethane and 1,1,2-trichloro-1,2,2 - trifluoroethane, the latter being generally preferred.

Pure organic solvents of the prior art dry cleaning processes may not satisfactorily remove soils which are insoluble in the solvent. Such soils are of two kinds. The first of these is soil which is insoluble both in the dry cleaning solvent and in water. Examples of such soils are street and household dust, soot and the like. Soils of this kind are particulate and are hereinafter called "particulate soils." Such soils also may be referred to as "rug beater soils" or "rug soils." As the last two names imply, these soils are accumulated in and recovered from rugs and they include street and household dust and the like. Such soil are discussed in the Technical Bulletin of the National Institute of Drycleaning, Silver Spring, Md., October 1968, T-443.

The second kind of soil comprises those soils which, although insoluble in the solvent, are, at least to some degree, soluble in water. Examples of soils of this kind, hereinafter called "water-soluble soils," are perspiration salts, albumens and sugars. For the purpose of removing particulate and to some extent water-soluble soils, detergents often are added to the solvents. The detergents displace such soils and suspend them in the solvent, thus removing them from the clothing. Such mixtures of solvent and detergents are called "charged systems." The effectiveness of charged systems in removing water-soluble soil may be enhanced by adding water, the water being either emulsified or solubilized in the system. Such mixtures are called "wet systems;" those having no added water, that is, no water is added during their formulation, exhibit in the vapor space above the solution a water partial pressure corresponding to less than 50% relative humidity and are called "dry systems." The term "fluid" as used herein is intended to mean any dry cleaning mixture, either wet or dry, ready for use.

As indicated above, wet systems contain solvent, detergent and emulsified or solubilized water. Detergent-solvent combinations vary widely in their ability to emulsify or solubilize water. Some prior art combinations can solubilize large amounts of water. For example, it is known from U.S. Pat. 3,336,232 that isopropylammonium dodecylbenzenesulfonate can solubilize about three times its own weight of water in 1,1,2-trichloro-1,2,2-trifluoroethane; Canadian Pat. 582,455 discloses that the same detergent in Stoddard solvent can solubilize only about twice its own weight of water. This detergent can solubilize much smaller amounts of water in other chlorinated solvents. U.S. Pat. 3,042,479 suggests amine salts of dodecylbenzenesulfonic acid in 1,1,2-trichloro-1,2,2-trifluoroethane as dry cleaning fluids to be used either dry or wet. German publication 1,926,130 discloses mixed amine salts of dodecylbenzenesulfonic acid in combination with 1,1,2-trichloro-1,2,2-trifluoroethane for solubilizing large quantities of water. Such mixtures are further disclosed as dry cleaning fluids. Although water solubilization is preferred over emulsification, solubilization of substantial amounts of water does not necessarily confer useful properties on a dry cleaning fluid. At least in the case of 1,2,2-trichloro-1,2,2-trifluoroethane, although alkylbenzenesulfonates provide systems which are capable of solubilizing relatively large amounts of water, the water in such systems may damage the material being dry-cleaned. An even more serious problem which may be encountered with such fluids is that they are characterized by high particulate soil redeposition, that is, suspended particulate soil is subsequently, at least in part, redeposited on the clothes. This process of redeposition is called "graying."

It is known from dry cleaning prior art that, in an equilibrium state, the water in a wet system is distributed between the clothes, the fluid and the vapor space, and that the relative humidity of the water in the vapor space approximates the relative humidity of the water (due to the partial pressure of the water) in the fluid. Hence, the measurement of the relative humidity of the vapor space provides a measure of the relative humidity of the fluid which in turn provides a measure of the availability of the water in the fluid for inflicting water damage on the clothing being dry-cleaned. Devices for measuring the vapor space relative humidity are readily commercially available.

According to the National Institute of Drycleaning, Silver Spring, Md., about 70–80% vapor space relative humidity normally is preferred in wet systems, although higher humidities, for example 90%, can be tolerated for short periods of time. These values are based upon normal dry cleaning operations wherein mixed types of fabrics are being cleaned. In general, higher humidities can be tolerated in cleaning hydrophobic fibers, while low humidities may have to be used with hydrophilic fibers. In practice, the amount of water which is added to form a wet system is estimated, taking into account the moisture content of the clothes. If too much water is added, water damage to the clothes and increased finishing costs may result. If insufficient water is added, depending on the dry cleaning fluid, removal of water-soluble soil may be inadequate.

As stated above, solubilized water, that is, molecularly dispersed water, is preferred over emulsified water. In the first case, excess water is evenly distributed over the clothes, whereas in the second case, the clothing may become spotwise sodden with water. Water in the form of a gross separate phase is undesirable; it follows that water added to the system should be quickly solubilized.

German publication 1,004,759 discloses the use of about 3 weight percent of an alkyl phosphate as the sole detergent in benzine and in tri- and tetrachloroethylene. The publication also discloses that redeposition in the resultant fluid is reduced below that characteristic of the pure solvent. As suggested above, such mixtures may be unacceptably corrosive. Further, German publication 1,935,905 discloses that phosphates alone may not be satisfactory in wet systems because they solubilize only very small amounts of water, at least in trichloroethylene.

Commercial dry cleaning machines which employ 1,1,2-trichloro-1,2,2-trifluoroethane or trichlorofluoromethane are distinguished from machines intended for use with other solvents in that, in the former, means generally are provided for the distillation of 30 to 100% of the solvent after each use. A concentrated solution of detergent in solvent may be added automatically in a predetermined amount to such redistilled solvent in the wash cycle so as to provide the desired concentration of detergent in the dry cleaning fluid. In a similar fashion, water can be dispensed, of desired.

OBJECTS AND SUMMARY OF THE INVENTION

It is an object of this invention to provide dry cleaning compositions which are useful in fluorocarbon dry cleaning systems, especially systems employing 1,1,2-trichloro-1,2,2-trifluoroethane or trichlorofluoromethane. Another object is to provide liquid concentrates which can be diluted with solvent to form dry cleaning fluids. A further object is to provide fluorocarbon dry cleaning fluids which contain water but which exhibit lower fluid and vapor space relative humidities than similar prior art fluids which contain the same amount of water. Another object is to provide dry cleaning processes employing such fluids. A still further object is to provide dry cleaning fluids and processes which exhibit superior soil redeposition characteristics and which minimize water damage to the material being dry-cleaned.

It has been found that prior art dry cleaning compositions which are based on an alkylbenzenesulfonate and 1,1,2-trichloro-1,2,2-trifluoroethane can be improved so as to have superior properties, especially in respect to particulate soil redeposition and ability to solubilize water and control fluid and vapor space relative humidities. The newly-discovered compositions comprise:

(a) a fluorocarbon solvent selected from the group consisting of 1,1,2-trichloro-1,2,2-trifluoroethane and trichlorofluoromethane, (b) a first salt which is formed by essentially neutralizing an alkylbenzenesulfonic acid, wherein the alkyl group contains about 8–18 carbon atoms, with an alkyl primary monoamine, wherein the alkyl group contains about 1–8 carbon atoms, and (c) a second salt which is formed by essentially neutralizing an alkyl phosphate selected from the group consisting of mono- and dialkyl phosphates, wherein the alkyl group contains about 8–20 carbon atoms, with an amine selected from the group consisting of (1) alkyl primary monoamines, primary and secondary alkylolamines and ammonia, wherein the alkyl group contains about 1–8 carbon atoms and the alkylol group contains about 4 carbon atoms, and (2) secondary, tertiary and quaternary alkyl monoamines and trialkylolamines, wherein the alkyl group contains about 1–8 carbon atoms and the alkylol group contains about 4 carbon atoms, the weight of the second salt being about 5–60% of the combined salt weights (total solute) when the amine used to form the second salt is selected from group (1) and about 5% of the combined salt weights (total solute) when the amine is selected from group (2). The mixture of the two salts (total solute) sometimes is referred to hereafter as "detergent." The aforesaid compositions are clear, single phase solutions.

Optionally, water can be present in the composition. Compositions containing 0.05–1.0 weight percent total solute are referred to herein as "dry cleaning fluids." Compositions wherein the total solute is greater than 1.0%, up to about 80 weight percent, are referred to herein as "concentrates." Such a concentrate can be diluted with additional solvent to yield the dry cleaning fluid.

BRIEF DESCRIPTION OF THE DRAWINGS

FIG. 1 is a graph depicting the relationship between water/detergent ratio and vapor space relative humidity for a prior art composition and three compositions of this invention. This figure is more fully described in Example 3. FIG. 2 is a graph relating the concentration of the second salt in the dry cleaning fluid to the redeposition of particulate soil. This figure is more fully described in Example 4.

DETAILED DESCRIPTION OF THE INVENTION

The invention resides in the discovery of the above-described compositions which are useful in dry cleaning processes. In the preferred compositions the fluorocarbon solvent is 1,1,2-trichloro-1,2,2-trifluoroethane, the first salt is formed from dodecylbenzenesulfonic acid and isopropylamine, the second salt is formed from mixed mono- and di($C_{8-12}$)alkyl phosphates and diethanolamine, and the second salt is about 33% of the total solute. The preferred compositions which are prepared as concentrates contain about 50% total solute; those preferred compositions which are prepared as dry cleaning fluids contain about 0.1% total solute if the system is dry (contains no added water), 0.3% total solute if the system is wet.

The concentrates can be diluted with additional solvent either manually or, preferably, they can be charged to a dry cleaning machine adapted to use such solvents and automatically dispensed in predetermined amounts to distilled solvent, thus directly yielding the dry cleaning fluid. Should a wet system be preferred, water can be similarly automatically dispensed; water thus added is quickly solubilized.

In preparing the compositions of this invention, preferably, the salts are mixed and solvent then is added with stirring to produce a clear solution. Usually, the first salt is added to the second salt which normally is a waxy semi-solid. If a concentrate is prepared, only sufficient solvent is added to produce the desired salt concentration, for example, greater than 1.0 to about 80%. Other methods of preparation can be employed. For example, each salt can be dissolved in the solvent and then the separate salt solutions can be mixed, or the two salts can be dissolved sequentially in the solvent. With either of the latter methods, difficulty may be encountered with certain second salts because of their insolubility in the solvent if first salt is not present. Additional information on salt interaction will be provided below.

As previously suggested, the prefered first salt is isopropylammonium dodecylbenzenesulfonate. Non-preferred variations on the structure of the first salt are also operable. For example, the chain length of the alkyl group of the alkylbenzenesulfonate is not unduly critical and can vary from about 8–18 carbon atoms. The amine which is employed to neutralize the sulfonic acid also is not critical within the aforesaid definition. Outside the definition, inoperable species are encountered. For example, diamines, such as ethylenediamine, and ammonia produce insoluble combinations with the sulfonic acid.

The preferred second salt is prepared from mixed mono- and di($C_{8-12}$)alkyl phosphates and diethanolamine. $C_{8-20}$-alkyl phosphates are broadly operable. Although diethanolamine is preferred, other amines within the aforesaid definition are operable. When the aforesaid alkyl primary monoamines, primary and secondary alkylolamines or ammonia are employed to produce the second salt, and the weight ratio of first salt to second salt is about 1:2, the salt mixture (total solute) usually is soluble in fluorocarbon solvent at least to the extent of about 80%. Such salt mixtures, containing about 33% of the second salt, are preferred, although salt mixtures wherein the second salt is 5–60% of the mixture also are operable. If secondary, tertiary or quaternary alkyl monoamines or trialkylolamines are employed to prepare the second salt, the mixed salts are not as soluble in the fluorocarbon solvent. However, such lesser soluble salt mixtures still provide dry cleaning fluids which inhibit soil redeposition. Generally, when the second type of amine is employed to prepare the second salt, the second salt represents about 5% of the total solute. At such lower levels, the solubility of the total solute in the fluorocarbon solvent usually is at least about 80%.

It has been found that the second salt is particularly effective for inhibiting redeposition of particulate soil. Dry cleaning fluids wherein the concentration of the second salt is as low as 0.01 weight percent are effective in inhibiting redeposition. As indicated above, it is preferred that the dry cleaning fluids of this invention contain about 0.3% of total solute if the system is wet, 0.1% if the system is dry. Dry cleaning fluids containing 0.1–1.0 weight percent of total solute are broadly operable. The compositions of this invention are stable throughout the usual life of dry cleaning fluids and concentrates, that is, at least 2–3 months.

The properties of the total solute are not simply the sum of the properties of the two salts which are admixed. There appears to be interaction between the salts as shown by the fact that some second salts which are essentially insoluble in the fluorocarbon solvent when used alone become soluble in the presence of the first salt. The solubilizing influence also has been noted in other ways. For example, the preferred second salt, from mixed phosphates and diethanolamine, can be dissolved in 1,1,2-trichloro-1,2,2-trifluoroethane by heating. However, in the presence of moisture, a precipitate forms. When the preferred first salt is present, that is, the salt from isopropylamine and dodecylbenzenesulfonic acid, the second salt dissolves immediately and is permanently soluble and useful concentrates can be prepared therefrom.

It also has been discovered that the presence of second salt in the fluorocarbon solvent solution of first salt confers on the solution a lesser dependence of liquid and vapor space relative humidities on the water content of the solution. As already indicated above, measurement of vapor space relative humidity provides a measure of the relative humidity of the water in the dry cleaning fluid. From FIG. 2 it can be seen that at a given vapor space (and liquid) relative humidity, the compositions of this invention, containing first and second salts and solvent, can hold more water in solution than similar prior art compositions, for example, containing only first salt and solvent. Correspondingly, at a given water content, the compositions of this invention exhibit a lower vapor space (and liquid) relative humidity than such similar prior art compositions. This latter distinction may explain why prior art fluids which are known for their abilities to solubilize water do not exhibit the superior characteristic of the compositions of this invention in minimizing water damage to the clothing.

This discovery is of extreme practical significance in the preparation of wet systems. As indicated above, the amount of water added to produce a wet system usually is estimated, taking into consideration the water content of the material being dry-cleaned. If too much water is mistakenly added, water damage may be incurred by the material being dry-cleaned. The compositions of the present invention provide much more latitude in the preparation of wet systems since larger amounts of water can be tolerated than with prior art systems containing only the first salt and solvent. Clothing which is drycleaned with the compositions of this invention is much less susceptible to water damage than clothing which is dry-cleaned with the aforesaid similar prior art compositions.

EXAMPLE 1

In this example demonstrating the preparation of concentrates containing up to about 80 weight percent total solute, the second salt was prepared in 1,1,2-trichloro-1,2,2-trifluoroethane from various amines and mixed mono- and di($C_{8-12}$)alkyl phosphates. The first salt, isopropylammonium dodecylbenzenesulfonate, was added thereto. This example also demonstrates the solubilizing influence of the first salt on those second salts which are insoluble or only slightly soluble in the fluorocarbon.

One part of the mixed phosphate was dissolved in one part of the fluorocarbon. An amine falling within the second-salt amine definition of this invention was added incrementally with stirring. As long as the solution remained clear, addition was continued until the pH was neutral. Two parts of the first salt then were added; the solution remained clear. For those phosphate solutions which developed a precipitate upon addition of the amine, two parts of the first salt were added at the first appearance of precipitate. If the precipitate dissolved, the amine addition was resumed until a neutral pH was obtained. If the precipitate did not dissolve, the mixture was discarded and a new formulation was prepared using 1 part of phosphate, 19 parts of fluorocarbon and 20 parts of first salt. By this technique, clear concentrates were produced from the less soluble second salts.

The amines which were employed to produce second salts which were immediately soluble in the fluorocarbon were methylamine and 2-ethylhexylamine. When diethanolamine was employed, a precipitate formed but this was dissolved by heating the mixture to boiling. The amines which formed a precipitate which dissolved upon addition of the first salt were n-propylamine, isopropylamine, n-butylamine and ammonia. The amines which were employed under the technique using the larger quantities of fluorocarbon and first salt were di-n-butylamine, tri-n-butylamine, tetra-n-butylamine and triethanolamine.

EXAMPLE 2

In this example also demonstrating the preparation of concentrates, the first salt was prepared in 1,1,2-trichloro-1,2,2-trifluoroethane from various primary amines and dodecylbenzenesulfonic acid. The second salt, diethanolammonium mixed mono- and di($C_{8-12}$)alkyl phosphates, was added thereto.

One part of dodecylbenzenesulfonic acid was dissolved in one part of the fluorocarbon. An amine falling within the first-salt amine definition of this invention was added with stirring until the pH was neutral. Thereafter, 0.5 part of the second salt was added with stirring to form the concentrate. Amines employed to prepare the first salt were methylamine, n-propylamine, isopropylamine, n-butylamine and 2-ethylhexylamine. When ethylenediamine, diethanolamine, triethanolamine or ammonia was employed in place of the aforesaid primary amines, precipitation occurred and satisfactory concentrates could not be prepared.

These results, coupled with those of Example 1, suggest that cation exchange between sulfonate and phosphate, to form insoluble combinations, does not occur to any substantial degree.

EXAMPLE 3

This example demonstrates the preparation of the dry cleaning fluids of this invention and their effectiveness in solubilizing water. It also demonstrates that the relative humidity in the vapor space and in the fluid can be controlled readily by employing the fluids of this invention. Finally, it suggests why the compositions of this invention have much less tendency to water-damage the clothing being dry-cleaned than similar prior art compositions.

The first salt was isopropylammonium dodecylbenzenesulfonate and the second salt was diethanolammonium mixed mono- and di($C_{8-12}$)alkyl phosphates. 1,1,2-trichloro-1,2,2-trifluoroethane or trichlorofluoromethane was employed as the fluorocarbon solvent. Table 1 shows the concentrations of the salts, and the fluorocarbon, employed in the preparation of the fluids. Fluid No. 1 is representative of the prior art. In each case, the total solute concentration was 0.3 weight percent.

TABLE 1

| Fluid number | Solvent | First salt (wt. percent) | Second salt (wt. percent) |
|---|---|---|---|
| 1 | 1,1,2-trichloro-1,2,2-trifluoroethane | 0.3 | 0 |
| 2 | do | 0.2 | 0.1 |
| 3 | do | 0.15 | 0.15 |
| 4 | Trichlorofluoromethane | 0.20 | 0.10 |

Samples of the fluids were placed in closed round-bottom flasks equipped with a magnetic stirrer, a micropipette and, in the vapor space, the probe of a Minneapolis-Honeywell Relative Humidity Device Model W611A, a readily available, common, humidity measuring instrument. Measured amounts of water were added in increments from the pipette with continuous stirring. After each addition, the measured relative humidity in the vapor space was recorded after it became constant. About 30 minutes were required after each addition for the system to equilibrate and to yield constant relative humidity values. The results are shown in FIG. 1 which is a plot of vapor space relative humidity against the water/detergent (total solute) weight ratio.

EXAMPLE 4

Laboratory dry cleaning tests;
Launder-Ometer procedure

The Launder-Ometer used in the tests was a device similar to devices used for the estimation of color fastness, as described for example in the American Association of Textile Chemists and Colorists Technical Manual (1970), page 154. 8 oz. wide-neck screw-cap bottles containing 20 stainless steel balls of 7 mm. diameter were rotated at 75 r.p.m. for 20 minutes at room temperature with 160 ml. of test fluid and textile swatches as described below.

Estimation of particulate soil removal

Standard clean and soiled cotton swatches prepared by the National Institute of Drycleaning were employed in the tests. The soiled swatches contained screened and homogenized carpet soil (rug beater or particulate soil). Such soil is quite comparable to particulate soil normally encountered in dry cleaning.

The measure of efficiency of particulate soil removal normally used commercially and reported herein is the measured reflectance (in percent) of the swatch after cleaning. In the tests, a Hunterlab Model D-4 reflectometer, calibrated against a D40-780 standard according to ASTM Method E97-55 using a green filter and excluding ultraviolet light, was used. The standard redepositions swatches exhibited initial reflectance values of 88–90%; the values after soiling with particulate soil were 55–63%.

Estimation of particulate soil removal was carried out simultaneously with particulate soil redeposition tests described in the next section.

Estimation of particulate soil redeposition

Two swatches, the first being a standard particulate soil swatch as described above and the other, a clean cotton swatch, both being 3.75 inches long and 3 inches wide, were treated in the same bottle according to the Launder-Ometer procedure above.

The arithmetic differences in percent reflectance before and after exposure of the clean swatches to the Launder-Ometer conditions are herein reported as particulate soil redeposition.

Estimation of water-soluble soil removal

Standard swatches of polyethyleneterephthalate supplied by the National Institute of Drycleaning were stained with the nonsubstantive, water-soluble basic dye Federal Drug and Cosmetic (FDC) Violet No. 1.

Reflectance measurements were made before and after the Launder-Ometer procedure. Values so obtained were substituted into the Kubelka-Munk equation (Martin et al., Drycleaning Technology and Theory, Interscience Publishers Inc., New York, N.Y., 1958), slightly simplified to the following form:

$$\text{water soluble soil removal} = \frac{\frac{(1-R_b)^2}{2R_b} - \frac{(1-R_a)^2}{2R_a}}{\frac{(1-R_b)^2}{2R_b} - 0.01} \times 100$$

wherein:
$R_a$ = Reflectance (percent divided by 100) after cleaning
$R_b$ = Reflectance (percent divided by 100) before cleaning.

Cleaning efficiency

Table 2 demonstrates the outstanding characteristics of the fluids of this invention, tested as described above, especially as to redeposition of particulate soil. Composition No. 1 is a prior art composition. Composition No. 1 contained trichlorofluoromethane as the fluorocarbon solvent; all the other compositions contained 1,1,2-trichloro-1,2,2-trifluoroethane as the solvent. In all cases, 99.7 parts of solvent were employed. The first salt was prepared from dodecylbenzenesulfonic acid and a primary amine; the second salt was prepared from mixed mono- and di (C$_{8-12}$)alkyl phosphates and an amine; the amines employed are shown in Table 2.

The above-described laboratory dry cleaning tests are regarded as being at least as severe as commercial operations.

Clothing charge 6 lbs. of precleaned garments soil with 0.03 lb. of particulate soil, 3 standard test towels of the National Institute of Dry

TABLE 2.—LABORATORY DRY CLEANING TESTS

| Composition No. | First salt | | Second salt | | Relative humidity (percent) | | Launder-Ometer test | | | | | |
|---|---|---|---|---|---|---|---|---|---|---|---|---|
| | | | | | | | Particulate soil | | | | Water-soluble soil | |
| | Parts (salt) | Amine | Parts (amine) | Amine | Swatch | Vapor | Removal | Standard error | Redeposition | Standard error | Removal | Standard error |
| 1 | 0.2 | Isopropylamine. | 0.1 | Diethanolamine. | 75 | 75 | 78.1 | 0.93 | 3.8 | 0.16 | 47.7 | 2.14 |
| 2 | 0.2 | ...do... | 0.1 | ...do... | (¹) | <50 | 81.8 | 0.05 | 2.1 | 0.05 | <20 | |
| 3 | 0.2 | ...do... | 0.1 | ...do... | (¹) | 75 | 83.4 | 0.31 | 1.5 | 0.18 | 74.2 | 6.3 |
| 4 | 0.2 | ...do... | 0.1 | ...do... | 90 | 90 | 83.2 | 0.60 | 1.7 | 0.0 | 76.4 | 0.25 |
| 5 | 0.285 | ...do... | 0.015 | di-n-Butylamine. | (¹) | <50 | 78.1 | 0.25 | 2.8 | 0.0 | <20 | |
| 6 | 0.2 | n-Butylamine. | 0.1 | Diethanolamine. | (¹) | <50 | 80.0 | 0.15 | 1.6 | 0.03 | <20 | |
| 7 | 0.2 | Isopropylamine. | 0.1 | ...do... | (¹) | ca. 70 | 79.1 | 0.35 | 2.8 | 0.0 | <20 | |
| 8 | 0.3 | ...do... | 0 | | (¹) | 72 | 78.0 | | 5.4 | | 49.8 | |

¹ Equivalent to ambient humidity (50-70%).

Efficacy of a second salt in inhibiting particulate soil redeposition at medium and low concentrations This portion of this example demonstrates the effectiveness of the second salt in substantially reducing the redeposition of particulate soil; the redeposition achieved is less than that which usually is realized in commercial practice. The National Institute of Drycleaning regards redepositions of 5% or less as excellent. According to the above-mentioned October 1968 Bulletin of the Institute, the average redeposition in commercial dry cleaning machines is 6-10%.

Four water-free dry cleaning fluids were subjected to particulate soil redeposition tests as described above. The solvent was 1,1,2-trichloro-1,2,2-trifluoroethane, the first salt was isopropylammonium dodecylbenzenesulfonate and the second salt was diethanolammonium mixed mono- and di(C$_{8-12}$)alkyl phosphates. The fluids contained 0.3 weight percent of the two salts. In order to more clearly show the effect of the concentration of the second salt, one of the flour fluids was prepared so as to contain only the first salt and solvent that is, 0% second salt. The results are shown in FIG. 2 which is a plot of percent redeposition against percent phosphate in detergent (total solute). Under test conditions the solvent alone redeposited 8.7% particulate oil.

EXAMPLE 5

Commercial scale dry cleaning tests

Clothing, artificially solided with particulate soil for better experimental control, was cleaned in a commercial device (Vic-Model 141) using the preferred concentrate in the presence of test redeposition swatches. This machine redistills each charge after use, thus providing fresh solvent for each new charge, and it can dispense a predetermined quantity of concentrate to the solvent of the wash cycle to form the fluid. The machine does not provide means for continuous filtration during the wash cycle.

Cleaning program (1) 20-minute wash cycle employing 78 lbs. of 1,1,2-trichloro-1,2,2-trifluoroethane to which 0.47 lbs. of preferred concentrate had been dispensed,
(2) 1.5-minute rinse cycle in fresh solvent,
(3) 2.5-minute extraction (centrifugation),
(4) 18-minute drying cycle.

Composition of the concentrate 2 parts by weight isopropylammonium dodecylbenzenesulfonate,
1 part by weight diethanolammonium mixed mono and di(C$_{8-12}$)alkyl phosphates,
3 parts by weight 1,1,2-trichloro-1,2,2,-trifluoroethane.

Cleaning comprising cotton and cotton-polyethylene-terephthalate redeposition and particulate soil swatches.

Results

Six separate cleaning operations were carried out under the above conditions. The particulate soil removal-redeposition results, measured on the test swatches as before, were as follows:

Particulate soil removal _____ 83.0 (std. error 0.58).
Particulate soil redeposition:
   On cotton _____ 3.6 (std. error 0.19).
   On cotton-polyethylene terephthalate _____ 3.9 (std. error 0.23).

The experiment was repeated in five separate cleaning operations except that 0.94 lb. of concentrate was employed. The results were as follows:

Particulate soil removal _____ 82.8 (std. error 0.29).
Particulate soil redeposition:
   On cotton _____ 3.8 (std. error 0.21).
   On cotton-polyethylene-terephthalate _____ 4.2 (std. error 0.62).

The embodiments of the invention in which an exclusive property or privilege is claimed are defined as follows:

1. Single phase dry cleaning composition consisting essentially of:
   (a) a fluorocarbon solvent selected from the group consisting of 1,1,2-trichloro-1,2,2-trifluoroethane and trichlorofluoromethane,
   (b) a first salt which is formed by essentially neutralizing an alkylbenzenesulfonic acid, wherein the alkyl group contains about 8–18 carbon atoms, with an alkyl primary monoamine, wherein the alkyl group contains about 1–8 carbon atoms, and
   (c) a second salt which is formed by essentially neutralizing an alkyl phosphate selected from the group consisting of mono- and dialkyl phosphates, wherein the alkyl groups contain about 8–20 carbon atoms, with an amine selected from the group consisting of
     (1) alkyl primary monoamines, primary and secondary alkylolamines and ammonia, wherein the alkyl group contains about 1–8 carbon atoms and the alkylol group contains about 4 carbon atoms, and
     (2) secondary, tertiary and quaternary alkyl monoamines and trialkylolamines, wherein the alkyl group contains about 1–8 carbon atoms and the alkylol group contains about 4 carbon atoms, the weight of the second salt being about 5–60% of the combined salt weights when the amine used to form the second salt is selected from group (1) and about 5% of the combined salt weights when the amine is selected from group (2), the combined weights of the first and second salts being 0.05–80 weight percent of the composition.

2. The composition of claim 1 which contains water.

3. The composition of claim 1 in which the combined weight of the two salts is about 50 weight percent.

4. The composition of claim 1 in which the combined weight of the two salts is about 0.05–1.0 weight percent.

5. The composition of claim 4 which contains water and which has a vapor space relative humidity not in excess of about 90%.

6. The composition of claim 5 in which the combined weight of the two salts is about 0.3 weight percent.

7. The composition of claim 1 in which the combined weight of the two salts is about 0.1 weight percent.

8. The composition of claim 1 wherein the solvent is 1,1,2-trichloro-1,2,2-trifluoroethane, the first salt is isopropylammonium dodecylbenzenesulfonate and the second salt is diethanolammonium mixed mono- and di($C_{8-12}$) alkyl phosphates.

9. The composition of claim 1 wherein the second salt is prepared from an amine of group (1) and the weight of the second salt is about 5–60% of the combined weight of the two salts.

10. The composition of claim 9 wherein the weight of the second salt is about 33% of the combined weight of the two salts.

11. The composition of claim 1 wherein the second salt is prepared from an amine of group (2) and the weight of the second salt is about 5% of the combined weight of the two salts.

References Cited
UNITED STATES PATENTS

| | | | |
|---|---|---|---|
| 3,642,644 | 2/1972 | Henry et al. | 8—142 |
| 3,352,790 | 11/1967 | Woodward et al. | 252—171 |
| 3,162,604 | 12/1964 | Michaels | 252—171 |
| 2,005,619 | 6/1935 | Graves | 252—Dig. 17 |
| 3,366,571 | 1/1968 | Unfer et al. | 252—Dig. 17 |
| 3,441,620 | 4/1969 | McDonald | 252—171 |
| 3,562,168 | 2/1971 | Michaels et al. | |

WILLIAM E. SCHULZ, Primary Examiner

U.S. Cl. X.R.

8—142; 252—545